US009894331B2

(12) United States Patent
Lin

(10) Patent No.: US 9,894,331 B2
(45) Date of Patent: Feb. 13, 2018

(54) PROJECTOR DEVICE AND HEAT DISSIPATION SYSTEM THEREOF

(71) Applicant: Qisda Corporation, Taoyuan County (TW)

(72) Inventor: Chi-Cheng Lin, Taoyuan County (TW)

(73) Assignee: Qisda Corporation, Taoyuan (TW)

( * ) Notice: Subject to any disclaimer, the term of this patent is extended or adjusted under 35 U.S.C. 154(b) by 0 days.

(21) Appl. No.: 15/239,847

(22) Filed: Aug. 18, 2016

(65) Prior Publication Data
US 2017/0054956 A1 Feb. 23, 2017

(30) Foreign Application Priority Data

Aug. 18, 2015 (TW) .............................. 104126902 A

(51) Int. Cl.
*G03B 21/16* (2006.01)
*H04N 9/31* (2006.01)
*G02B 26/08* (2006.01)

(52) U.S. Cl.
CPC ....... *H04N 9/3144* (2013.01); *G02B 26/0833* (2013.01); *G03B 21/16* (2013.01)

(58) Field of Classification Search
CPC ...... G03B 21/16; G03B 21/28; G03B 21/145; H01L 2023/405; H01L 2023/4087; H01L 2023/4062; H01L 2023/4081
See application file for complete search history.

(56) References Cited

U.S. PATENT DOCUMENTS

| 2005/0265001 | A1* | 12/2005 | Saito ................... H01L 23/4006 361/710 |
| 2006/0245161 | A1 | 11/2006 | Maruyama et al. |
| 2008/0024733 | A1* | 1/2008 | Gerets ............... G02F 1/133553 353/52 |
| 2012/0099324 | A1* | 4/2012 | Robitaille .......... G02B 27/0994 362/294 |
| 2012/0327316 | A1* | 12/2012 | Okada .................... G03B 21/16 348/748 |
| 2015/0260793 | A1 | 9/2015 | Chen |

FOREIGN PATENT DOCUMENTS

TW 200638173 A 11/2006
TW M480762 U 6/2014

OTHER PUBLICATIONS

Office action of counterpart application by Taiwan IP Office on Aug. 9, 2016.

* cited by examiner

Primary Examiner — Sultan Chowdhury

(57) ABSTRACT

A projector device and a heat dissipation system thereof are provided. The heat dissipation system includes a heat dissipating target chip and a heat dissipating module. The heat dissipating target chip has a bottom surface having a heat dissipating area. The heat dissipating module has a heat dissipating body and a heat passage. The heat dissipating body includes a connection end facing the bottom surface, and the heat passage extends out from the connection end and is heat exchange connected to the heat dissipating area. The heat passage has a first cross-section and a second cross-section, wherein the second cross-section is farther away to the heat dissipating area than the first cross-section. The second cross-section area is larger than the first cross-section area.

17 Claims, 4 Drawing Sheets

PROJECTOR DEVICE AND HEAT DISSIPATION SYSTEM THEREOF

BACKGROUND

1. Technical Field

The present disclosure generally relates to a projector device and heat dissipation system thereof; particularly, the present disclosure relates to a projector device utilizing a heat dissipating chip and heat dissipation system thereof.

2. Description of the Related Art

Within many different display devices, projectors are continually being developed where new designs are continually being employed and produced. For instance, Digital Light Processing (DLP) technology, as it matures and is being widely used on projectors, is an example of such a design. DLP is based on Digital Micromirror Device (DMD) technology, wherein each micromirror selectively reflects light from a light source to generate projected screen images.

No matter which type of projector is involved, heat dissipation has always been a particular problem of concern. For instance, fans or other related heat dissipation structures need to be installed with regards to light sources, circuits, and other sources of heat. When DLP is employed, since a large amount of heat will be concentrated on the digital micromirror chip, additional heat dissipating units would need to be installed to conduct heat away from the digital micromirror chip. However, due to the fact that a micro lens for light reflection is installed right in front of the micromirror chip, heat can only be conducted out from the back. However, connection pins for connecting with signal circuits are typically installed behind the micromirror chip, which makes designing heat dissipating structures at that spot even more difficult.

SUMMARY

It is an objective of the present disclosure to provide a projector device and heat dissipation system thereof having better heat dissipating efficiency.

It is another objective of the present disclosure to provide a projector device and heat dissipation system thereof that can take into account the space requirements of installment of other components.

In one aspect of the present invention, the projector device includes a heat dissipating target chip and a heat dissipating module. The heat dissipating target chip has a bottom surface, wherein the bottom surface has a heat dissipating area. The heat dissipating module has a heat dissipating body and a heat passage. The heat dissipating body has a connection end opposite the bottom surface. The heat passage extends from the connection end and is heat exchange connected to the heat dissipating area. The heat passage has a first cross-section and a second cross-section parallel to the heat dissipating area, wherein the second cross-section is farther away than the first cross-section to the heat dissipating area, and an area of the second cross-section is greater than the area of the first cross-section. Through this design, since the passage area of the heat passage at the second cross-section is relatively larger, heat energy transferred from the first cross-section would more quickly be transferred to the heat dissipating body, increasing heat dissipation efficiency in the process.

The projector device utilizes the above mentioned heat dissipation system, wherein the heat dissipating target chip is a digital micromirror device. Since the heat passage has a relatively smaller cross-section area closer to the digital micromirror device, and a relatively larger cross-section area closer to the heat dissipating body, the tasks of taking into account space needs to be left for other components, as well as increasing heat transfer efficiency can both be accommodated.

DETAILED DESCRIPTION OF THE PREFERRED EMBODIMENT

The present invention provides a projector device heat dissipation system and projector device utilizing this heat dissipation system. In one embodiment, the projector device uses Digital Micromirror Device (DMD) to control image generation, wherein the heat dissipation system is mainly concerned with the DMD for heat dissipation. However, in other different embodiments, the heat dissipation system may also be utilized in other different types of projector devices and can be targeted towards other heat sources to dissipate heat.

Figure 1:
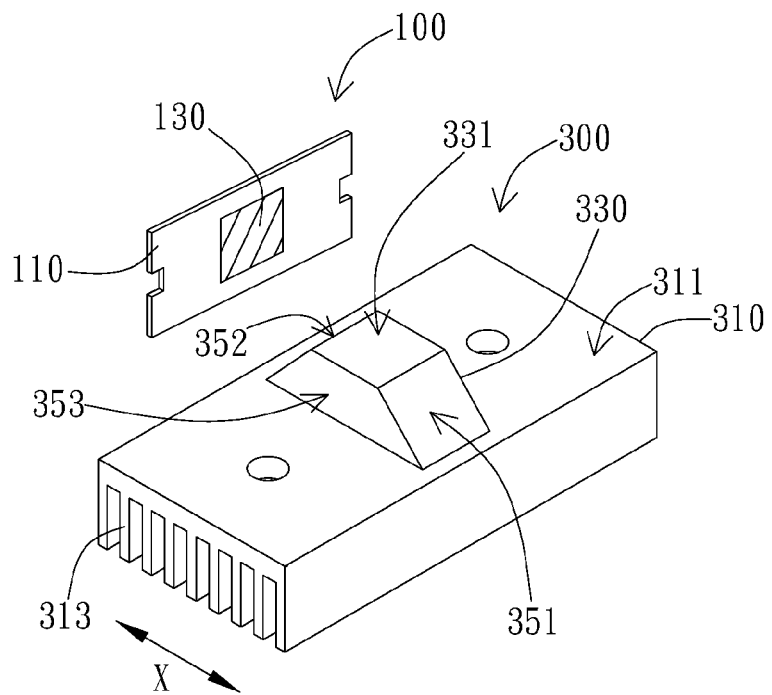
FIG. 1 is an embodiment of the projector device and heat dissipation system thereof of the present invention.
Figure 2:
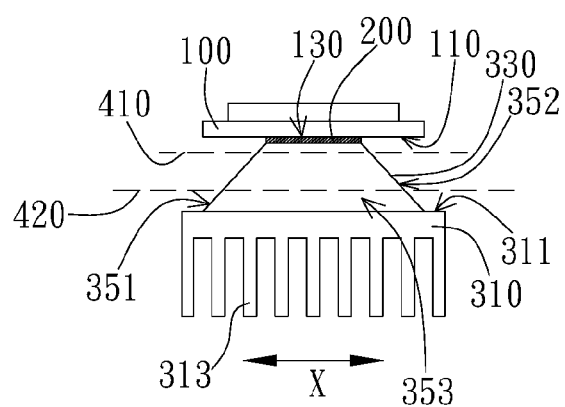
FIG. 2 is a side cross-sectional view of the embodiment of FIG. 1.

FIGS. 1 and 2 illustrate an embodiment of the projector device and heat dissipation system thereof of the present invention. As shown in FIGS. 1 and 2, the heat dissipation system includes a heat dissipating target chip 100 and a heat dissipating module 300. The heat dissipating target chip 100 has a bottom surface 110, wherein the bottom surface 100 includes a heat dissipating area 130. In one embodiment, the heat dissipating target chip 100 is a digital micromirror device (DMD), wherein a plurality of micro mirrors (not shown) are disposed on the front surface facing away from the bottom surface 110 to selectively reflect light from a light source in order to generate projected images. However, in other different embodiments, the heat dissipating target chip 100 may also be any other types of chips, such as a light-emitting diode light source chip, etc.

As shown in FIGS. 1 and 2, the heat dissipating module 300 includes a heat dissipating body 310 and a heat passage 330, wherein both are preferably formed from copper alloy, aluminum alloy, or any other materials of fast heat transfer. In the present embodiment, the heat dissipating body 310 and the heat passage 330 are preferably integrally formed as one; however, they are not limited or restricted to this. The heat dissipating body 310 has a connection end 311 facing towards a bottom surface 110 of the heat dissipating target chip 100, wherein on the side opposite the connection end 311 a plurality of heat dissipating fins 313 are disposed. However, in other different embodiments, other than the heat dissipating fins 313, the heat dissipating body 310 can also employ other different methods of heat dissipation. The heat passage 330 extends out from the connection end 311 and is heat exchange connected (or heat-exchangeably connected) with the heat dissipating area 130. In one embodiment, the area of the connection end 311 is greater than a sectional area of the heat passage 330. In other words, only a portion of the heat passage 330 is connected with the connection end 311, wherein the other portions are exposed out of the connection end 311. The heat passage 330 has a heat receiving surface 331 adhered with the heat dissipating area 130, wherein an adhesive 200 that can transfer heat is preferably distributed therebetween to fully fill any non-uniform places of the heat dissipating area 130 and the heat receiving surface 331 such that surface area for heat exchange or transfer can be maximized. The heat passage 330 receives heat energy from the heat dissipating target chip 100 through the heat dissipating area, and then transfers the heat to the heat dissipating body 310 for heat dissipation. In this manner, heat dissipation effects are achieved.

Figure 3:
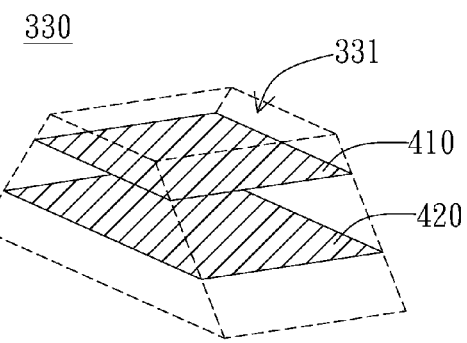
FIG. 3 is an embodiment of the first cross-section and second cross-section.

As illustrated in FIGS. 2 and 3, the heat passage 330 has a first cross-section 410 and a second cross-section 420 parallel to the heat dissipating area 130. The second cross-section 420 is farther away than the first cross-section 410 to the heat dissipating area 130. In other words, heat received from the heat dissipating area 130 will first pass through the first cross-section 410 before arriving at the second cross-section 420. As shown in FIG. 3, the area of the second cross-section 420 is greater the area of the first cross-section that is closer to the above heat receiving surface 331. Through this setup, since the passage area at the second cross-section 420 is relatively larger, the heat energy received from the first cross-section 410 will be transferred quicker and smoothly to the heat dissipating body 310 and increase heat dissipation efficiency.

In the present embodiment, the cross-sectional area of the heat passage 330 parallel to the heat dissipating area 130 will continuously increase as the distance from the heat dissipating area 130 increases. For instance, a side or multiple side wall surfaces of the heat passage 330 may be formed as a slanted outward flat surface or curved surface, whereby the heat passage 330 will then have an outer shape of a bucket or cone shape opening towards the heat dissipating body 310. In terms of the cross-sectional area as a function and the distance from the heat dissipating area 130 as a variable, the cross-sectional area can be formed from one or more times from the function with respect to the distance.

As shown in FIGS. 1 and 2, the heat passage 330 has a first wall surface 351 connected between the heat dissipating area 130 and the heat dissipating body 310. In the present embodiment, the first wall surface 351 extends completely slanted outwards towards the heat dissipating body 310 and is formed as a flat surface. However, in other different embodiments, the first wall surface 351 may extend towards the heat dissipating body 310 with only portions slanted outwards. As well, the first wall surface 315 may also be formed as a curved surface. In addition, in the present embodiment, the heat passage 330 may also have a second wall surface 352 opposite or corresponding to the first wall surface 351, wherein the two wall surfaces can be respectively slanted outwards at the same or differing inclination. As seen in the side view of the FIG. 2, a trapezoid shape can be formed. However, in other different embodiments, the second ball surface 352 can also be an upright wall surface to comply with different assembly and structural design requirements.

As illustrated in FIG. 2, the heat dissipating fins 313 disposed on the surface of the heat dissipating body 310 facing away from the connection end 311 preferably extends perpendicular to the extending direction X that extends along a third wall surface 353, wherein the heat dissipating fins 313 are arranged side by side along the extending direction X. Since the first wall surface 351 and the second wall surface 352 slant outwards, the contact between the heat passage 330 with the connection end 311 parallel to the extending direction X will be relatively longer. Through this setup, the heat passage 330 will span across relatively more heat dissipating fins 313, increasing the heat dissipation efficiency as a result.

Figure 4:
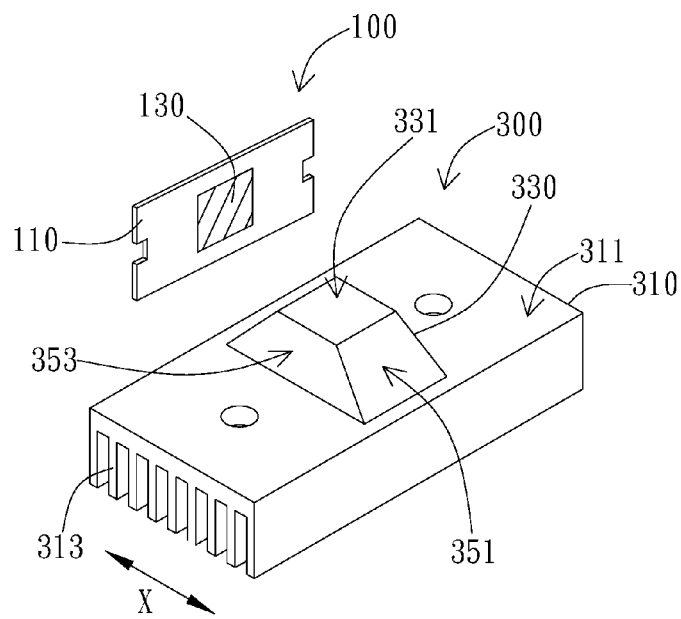
FIG. 4 is a variation of the embodiment of FIG. 1.
Figure 5:
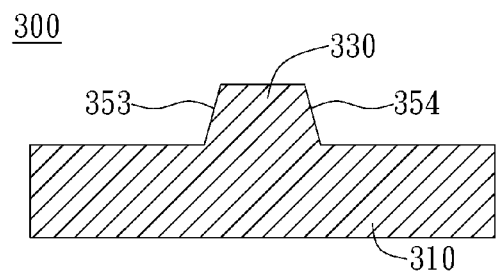
FIG. 5 is a side cross-sectional view of the embodiment of FIG. 4.

FIGS. 4 and 5 illustrate another embodiment of the heat passage 330. In the present embodiment, the heat passage 330 further has a third wall surface 353 and a fourth wall 354 that are opposite or correspond with each other and respectively sandwiched between the first wall surface 351 and the second wall surface 352. In other words, the outer surface of the heat passage 330 is collectively assembled from connecting together the first side wall 351, the third side wall 353, the second side wall 352, and the fourth side wall 354. The difference with the previous embodiment, as shown in FIG. 5, lies in that the third side wall 353 and the fourth side wall 354 also respectively extend slanted outwards toward the heat dissipating body 310. However, the inclination of the third wall surface 353 and the fourth wall surface 354 is greater than the inclination of the first wall surface 351 and the second wall surface 352, wherein the third wall surface 353 and the fourth wall surface 354 is relatively closer to being upright wall surfaces. Through this design, more space may be retained on the sides of the third wall surface 353 and the fourth wall surface 354 to accommodate other components while also maintaining a level of heat transfer or conducting effects.

Figure 6:
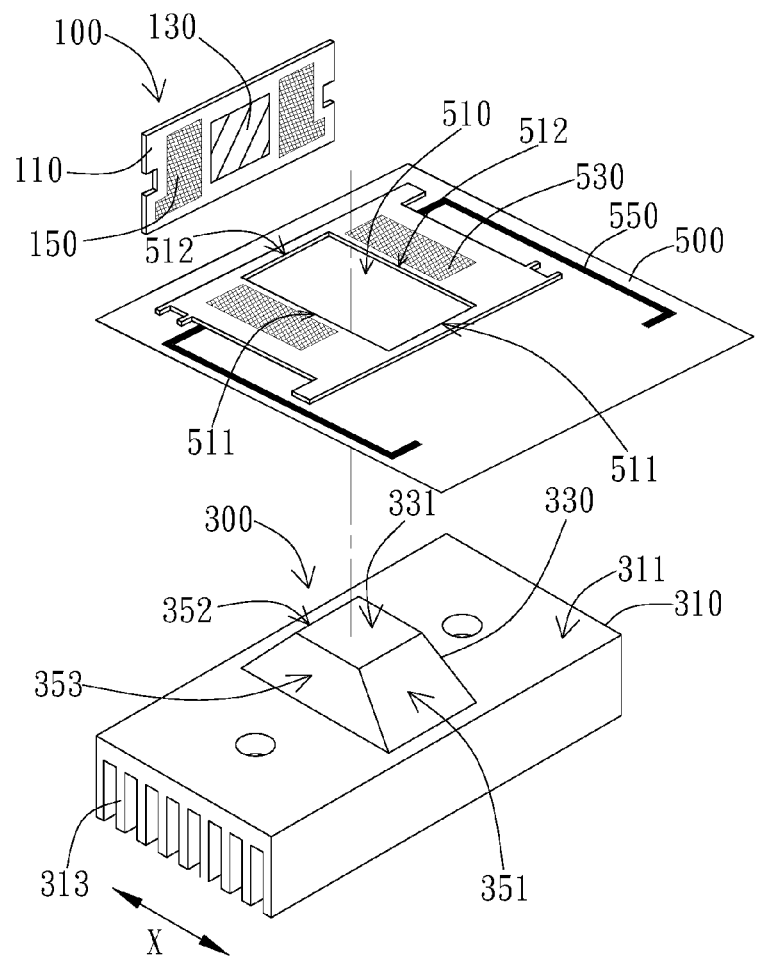
FIG. 6 is another embodiment of the projector device and heat dissipation system thereof.

In the embodiment shown in FIG. 6, the heat dissipating target chip 100 has one or many signal connection portions 150 disposed on the bottom surface 110 and positioned to a side outside the heat dissipating area 130. In one embodiment, the signal connection portion 150 is disposed on a side not having the first side wall 351 or second side wall 352 of the heat passage 330. For instance, the signal connection portion 150 may be disposed on a side corresponding to the third side wall. In addition, the projector device heat dissipation system further includes a circuit board 500 disposed between the bottom surface 110 and the heat dissipating body 310. A through hole 510 is formed on the circuit board 500 for the heat passage to pass through and connect with the heat dissipating area 130. A connection device 530 for electrically connecting with the signal connection portion 150 is preferably disposed on the circuit board 500. The connection device 530 preferably can be a male or female connector, or any other types of connectors. In addition, in other different embodiments, other different circuits may be utilized to electrically connect with the signal connection portion 150 in the circumstance where the circuit board 500 is not installed or employed.

As illustrated in FIG. 6, since the side of the circuit board 500 corresponding to the first side wall 351 does not have the connection device 530, more space is provided for the through hole 510 to extend. In other words, the first side wall 351 will not be restricted or limited to being an upright or nearly upright wall, as the first side wall 351 will be allowed to extend slanting outward at a greater inclination to increase heat transfer efficiency. In addition, the through hole 510 is preferably formed as a rectangular shape, wherein the side corresponding to the signal connection portion 150 is greater in length than the side corresponding to the first side wall 351 such that the first side wall 351 may slant at a greater inclination.

Figure 7:
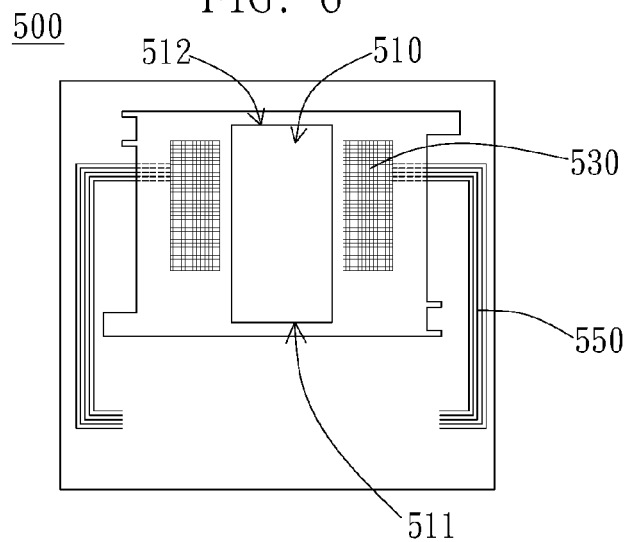
FIG. 7 is an embodiment of the circuit board.

FIG. 7 is a top view of the circuit board 500. As shown in FIG. 7, a connection circuit 550 electrically connected with the signal connection portion 150 is distributed on the circuit board 500, wherein the connection circuit 550 is preferably connected to the signal connection portion 150 through the connection device 530. In order to allow for the first side 511 of the through hole 510 corresponding to the first side wall 351 to have greater extending area, the connection circuit 550 is preferably uniformly distributed on a side of the through hole 510 not including the first side 511. For instance, the connection circuit 550 can directly extend from the connection device 530 towards the direction away the through hole 510. In the present embodiment, since the second wall surface 352 is also similarly outward slanting, the connection circuit 550 preferably is also disposed on a side of the through hole 510 not including the second side 512 that corresponds to the second wall surface 352.

Figure 8A:
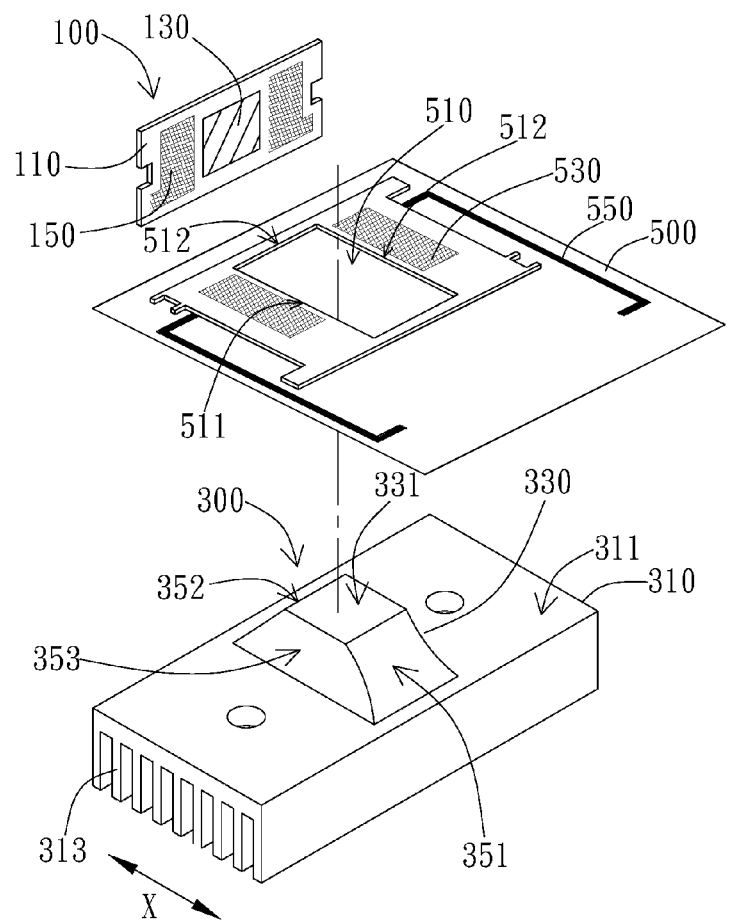
FIG. 8A is variation of the embodiment of FIG. 6.
Figure 8B:
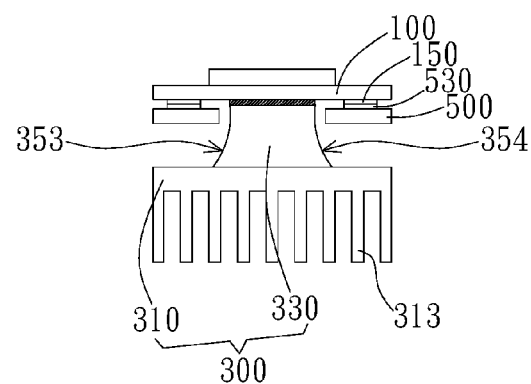
FIG. 8B is a side cross-sectional view of the embodiment of FIG. 8A.

FIGS. 8A and 8B are another embodiment of the present invention. As shown in FIG. 8A, the third wall surface 353 and the fourth wall surface 354 respectively are surfaces of the heat passage 300 facing the signal connection portion 150. In comparison to the above mentioned embodiments, the third wall surface 353 and the fourth wall surface 354 respectively extend slanted outwards toward the heat dissipating body 310, wherein the third wall surface 353 and the fourth wall surface 354 may be curved surfaces or flat surfaces. In the present embodiment, the average inclination of the third wall surface 353 and the fourth wall surface 354 is greater or larger than the average inclination of the first wall surface 351 and the second wall surface 352, wherein the third wall surface 353 and the fourth wall surface 354 is closer to being upright wall surfaces. Through this design, more space can be retained around the sides of the third wall surface 353 and the fourth wall surface 354 to accommodate other components while also maintaining a level of heat transfer effect. As shown in FIG. 8B, since the third wall surface 353 and the fourth wall surface 354 utilize curved surface designs, the upper portions of the heat passage 330 closer to the inside of the through hole 510 will be smaller with the lower portions closer to the heat dissipating body 310 increasingly bigger. In this manner, both the requirements for space to be retained for the signal connection portion 150 assembly and increased heat transfer efficiency can be accomplished.

Although the embodiments of the present invention have been described herein, the above description is merely illustrative. Further modification of the invention herein disclosed will occur to those skilled in the respective arts and all such modifications are deemed to be within the scope of the invention as defined by the appended claims.

What is claimed is:

1. A projector device heat dissipation system, comprising:
a heat dissipating target chip having a bottom surface, the bottom surface has a heat dissipating area; and
a heat dissipating module having:
a heat dissipating body having a connection end opposite the bottom surface; and
a heat passage extending from the connection end and heat exchange connected to the heat dissipating area, and the heat passage has a first wall surface connected between the heat dissipating area and the heat dissipating body, and at least a portion of the first wall surface extends slanted outwards toward the heat dissipating body;
wherein the heat passage has a first cross-section and a second cross-section parallel to the heat dissipating area, the second cross-section is farther away than the first cross-section to the heat dissipating area, and an area of the second cross-section is greater than the area of the first cross-section.

2. The projector device heat dissipation system of claim 1, wherein the area of the heat passage parallel to the heat dissipating area continuously increases as the distance therebetween with the heat dissipating area increases.

3. The projector device heat dissipation system of claim 1, wherein the heat dissipating target chip has a signal connection portion disposed on the bottom surface and positioned on a side outside the heat dissipating area; the signal connection portion is disposed on a side not having the first wall surface of the heat passage.

4. The projector device heat dissipation system of claim 3, further including a circuit board disposed between the bottom surface and the heat dissipating body, and a through hole is formed on the circuit board, wherein the heat passage passes through the through hole and is heat exchange connected to the heat dissipating area.

5. The projector device heat dissipation system of claim 4, wherein a length of a side of the through hole corresponding to the signal connection portion is longer than the length of a side of the through hole corresponding the first wall surface.

6. The projector device heat dissipation system of claim 4, wherein a connection circuit is distributed on the circuit board for connecting with the signal connection portion, the connection circuit is distributed at the through hole on a side not corresponding to the first wall surface.

7. The projector device heat dissipation system of claim 1, wherein the heat passage has a second wall surface disposed opposite the first wall surface and connects between the heat dissipating area and the heat dissipating body, wherein at least a portion of the second wall surface extends slanted outwards toward the heat dissipating body.

8. The projector device heat dissipation system of claim 7, wherein the signal connection portion is disposed on a side of the heat passage not including the first wall surface and the second wall surface.

9. A projector device, comprising:
a digital micromirror chip having a bottom surface, the bottom surface including a heat dissipating area; and
a heat dissipating module, including:
a heat dissipating body having a connection end corresponding to the bottom surface; and
a heat passage extending out from the connection end and heat exchange connected to the heat dissipating area, and the heat passage has a first wall surface connected between the heat dissipating area and the heat dissipating body, and at least a portion of the first wall surface extends slanted outwards toward the heat dissipating body;
wherein the heat passage has a first cross-section and a second cross-section parallel to the heat dissipating area, the second cross-section is farther from the heat dissipating area than the first cross-section, and area of the second cross-section is greater than area of the first cross-section.

10. The projector device of claim 9, wherein the area of the heat passage parallel to the heat dissipating area continuously increases as the distance therebetween with the heat dissipating area increases.

11. The projector device of claim 9, wherein the digital micromirror chip has a signal connection portion disposed on the bottom surface and positioned on a side outside the heat dissipating area; the signal connection portion is disposed on a side not having the first wall surface of the heat passage.

12. The projector device of claim 11, further including a circuit board disposed between the bottom surface and the heat dissipating body, and a through hole is formed on the circuit board, wherein the heat passage passes through the through hole and is heat exchange connected to the heat dissipating area.

13. The projector device of claim 12, wherein a length of a side of the through hole corresponding to the signal connection portion is longer than the length of a side of the through hole corresponding the first wall surface.

14. The projector device of claim 12, wherein a connection circuit is distributed on the circuit board for connecting with the signal connection portion, the connection circuit is distributed at the through hole on a side not corresponding to the first wall surface.

15. The projector device of claim 9, wherein the heat passage has a second wall surface disposed opposite the first wall surface and connects between the heat dissipating area and the heat dissipating body, wherein at least a portion of the second wall surface extends slanted outwards toward the heat dissipating body.

16. The projector device of claim 15, wherein the signal connection portion is disposed on a side of the heat passage not including the first wall surface and the second wall surface.

17. A projector device, comprising:
a digital micromirror chip having a bottom surface, the bottom surface including a heat dissipating area; and
a heat dissipating module, including:
a heat dissipating body having a connection end corresponding to the bottom surface; and
a heat passage extending out from the connection end and heat exchange connected to the heat dissipating area;
wherein the heat passage has a first cross-section and a second cross-section parallel to the heat dissipating area, the second cross-section is farther from the heat dissipating area than the first cross-section, and area of the second cross-section is greater than area of the first cross-section, and an area of the heat passage parallel to the heat dissipating area continuously increases as the distance therebetween with the heat dissipating area increases.

* * * * *